United States Patent
Burns

(10) Patent No.: US 6,831,795 B1
(45) Date of Patent: Dec. 14, 2004

(54) TAMPER PROOF DATA RECORDING SYSTEM

(76) Inventor: Timothy D. Burns, 16945 SW 113 Ct., Miami, FL (US) 33157

( * ) Notice: Subject to any disclaimer, the term of this patent is extended or adjusted under 35 U.S.C. 154(b) by 387 days.

(21) Appl. No.: 10/139,567

(22) Filed: May 6, 2002

(51) Int. Cl.[7] ................................ G11B 5/86
(52) U.S. Cl. ................ 360/15; 70/58; 53/459
(58) Field of Search .............. 360/15; 70/58; 53/459

(56) References Cited

U.S. PATENT DOCUMENTS

| | | | | |
|---|---|---|---|---|
| 5,194,963 A | * | 3/1993 | Dunlap et al. ............ | 360/15 |
| 5,628,213 A | * | 5/1997 | Broadbent ................ | 70/58 |
| 5,890,346 A | * | 4/1999 | Guess .................... | 53/459 |

* cited by examiner

Primary Examiner—Sinh Tran
Assistant Examiner—Rocio Colon
(74) Attorney, Agent, or Firm—Edward P. Dutkiewicz

(57) ABSTRACT

A data recording system for providing tamper proof recording has a housing; means to receive power to the system; an input port; at least one recording device; at least one storage device; a single cover with a locking means; a handling means to receive the storage devices following recording, stamp protective bags with indicia, seal the storage devices in the bags, and dispense the bags containing the storage devices through an output receptacle; an open button to unlock the cover only when no storage devices are in the system; input code keys and display for stamping indicia on the bags; a start key to lock the cover and activate recording; an off/eject key to stop the recording process and transfer the storage devices to the handling means.

7 Claims, 3 Drawing Sheets

TAMPER PROOF DATA RECORDING SYSTEM

BACKGROUND OF THE INVENTION

1. Field of the Invention

The present invention relates to a tamper proof data recording system and more particularly pertains to providing tamper proof dual recordings.

2. Description of the Prior Art

The use of data recording systems of known designs and configurations is known in the prior art. More specifically, data recording systems of known designs and configurations previously devised and utilized for the purpose of recording data are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,560,666 to Bookman issued Feb. 2, 1971, discloses a single drive dual cassette tape recorder with radio and tape duplicating. U.S. Pat. No. 3,747,069 to Hershberg issued Jul. 17, 1973, discloses interviewing machines and method. U.S. Pat. No. 5,194,963 to Dunlap et al issued Mar. 16, 1993, discloses a dual deck videocassette recorder system. Lastly, U.S. Pat. No. 5,628,213 to Broadbent issued May 13, 1997, discloses a VHS videocassette security device. While these devices fulfill their respective, particular objectives and requirements, the aforementioned patents do not describe a tamper proof data recording system that allows providing tamper proof dual recordings.

In this respect, the tamper proof data recording system according to the present invention substantially departs from the conventional concepts and designs of the prior art, and in doing so provides an apparatus primarily developed for the purpose of providing tamper proof dual recordings.

Therefore, it can be appreciated that there exists a continuing need for a new and improved tamper proof data recording system which can be used for providing tamper proof dual recordings. In this regard, the present invention substantially fulfills this need.

SUMMARY OF THE INVENTION

In view of the foregoing disadvantages inherent in the known types of data recording systems of known designs and configurations now present in the prior art, the present invention provides an improved tamper proof data recording system. As such, the general purpose of the present invention, which will be described subsequently in greater detail, is to provide a new and improved tamper proof data recording system and method which has all the advantages of the prior art and none of the disadvantages.

To attain this, the present invention essentially comprises a housing of a generally rectangular configuration having a top face, a bottom face, a front face, a rear face, a first side face and a second side face. A cord is adapted to couple with a power supply to provide power to the system through an aperture in the first side face of the housing. An input port is provided the housing. The input port is adapted to provide an input signal to the system. Next provided are a pair of tape recorder heads on the top face of the housing. The tape recorder heads are adapted to simultaneously copy the input signal to a pair of tapes. A single cover is next provided. The cover encloses both recorder heads. The cover has a locking means to prevent the premature opening of the cover during activation. Next provided is a handling means adjacent to the tape recorder heads within the housing. The handling means has a bag input on the front face of the housing. The handling means also has an output receptacle on the front face. The handling means is adapted to receive the tapes following recording, stamp protective bags with pertinent and identifiable indicia, seal the tapes individually in the plastic protective bags, and dispense the bags containing the tapes through the output receptacle. Access is prevented through the entire process thus providing tamperproof recording of the tapes. An open button is next provided. The open button is on the top face. The open button is adapted to unlock the cover to the recorder heads and allow the insertion of the blank tapes only when no tapes are in the system. Next provided are a plurality of input code keys and display on the top face of the housing. The keys and display are adapted to allow the user to stamp the bags before the tapes are inserted with pertinent information including but not limited to date, time, and case number. An external port is provided for transfer of recording to a remote device. Next provided is a start key on the top face. The start key is adapted to lock the cover to the recorder heads and activate the recording of the input signal. Finally, an off/eject key is provided on the top face. The off/eject key is adapted to terminate the recording process and to transfer the tapes to the handling means. In this manner from the time the system is activated with the start key and terminated with the off/eject key sending the tapes to the handling means and out the output receptacle, the recorded tapes will be unable to be edited in any way and will be sealed in protective bags for safe keeping.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tamper proof data recording system which has all of the advantages of the prior art data recording systems of known designs and configurations and none of the disadvantages.

It is another object of the present invention to provide a new and improved tamper proof data recording system which may be easily and efficiently manufactured and marketed.

It is further an object of the present invention to provide a new and improved tamper proof data recording system which is of durable and reliable constructions.

An even further object of the present invention is to provide a new and improved tamper proof data recording system which is susceptible of a low cost of manufacture with regard to both materials and labor, and which accordingly is then susceptible of low prices of sale to the consuming public, thereby making such tamper proof data recording system economically available to the buying public.

Even still another object of the present invention is to provide a tamper proof data recording system for providing tamper proof dual recordings.

Lastly, it is an object of the present invention to provide a new and improved data recording system for providing tamper proof recording having a housing; means to receive power to the system; an input port; at least one recording device; at least one storage device; a single cover with a locking means; a handling means to receive the storage devices following recording, stamp protective bags with indicia, seal the storage devices in the bags, and dispense the bags containing the storage devices through an output receptacle; an open button to unlock the cover only when no storage devices are in the system; input code keys and display for stamping indicia on the bags; a start key to lock the cover and activate recording; an off/eject key to stop the recording process and transfer the storage devices to the handling means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
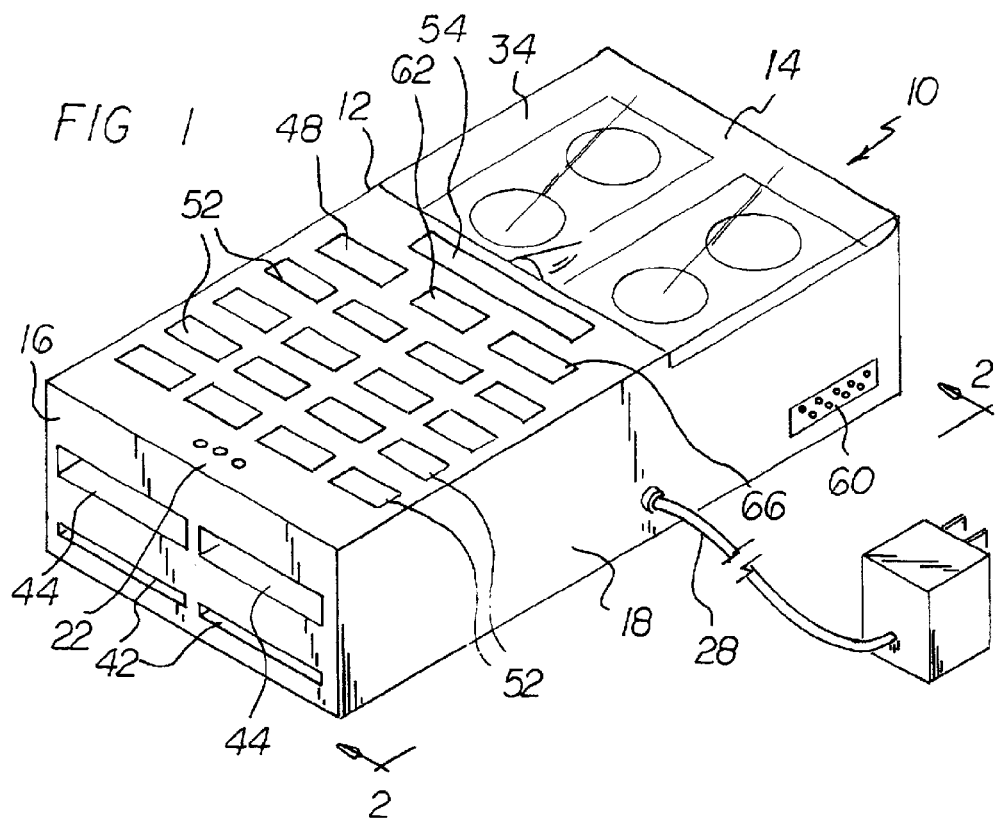
FIG. 1 is a perspective illustration of a recording system constructed in accordance with the principles of the present invention.
Figure 2:
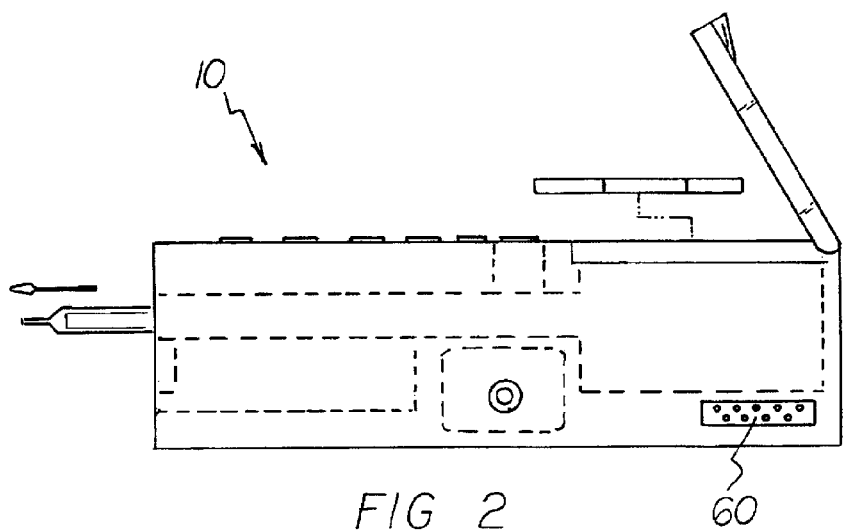
FIG. 2 is a right side elevational view of the system taken along line 2-2 of FIG. 1 and showing the insertion of a blank tape and the ejection of a recorded tape.
Figure 3:
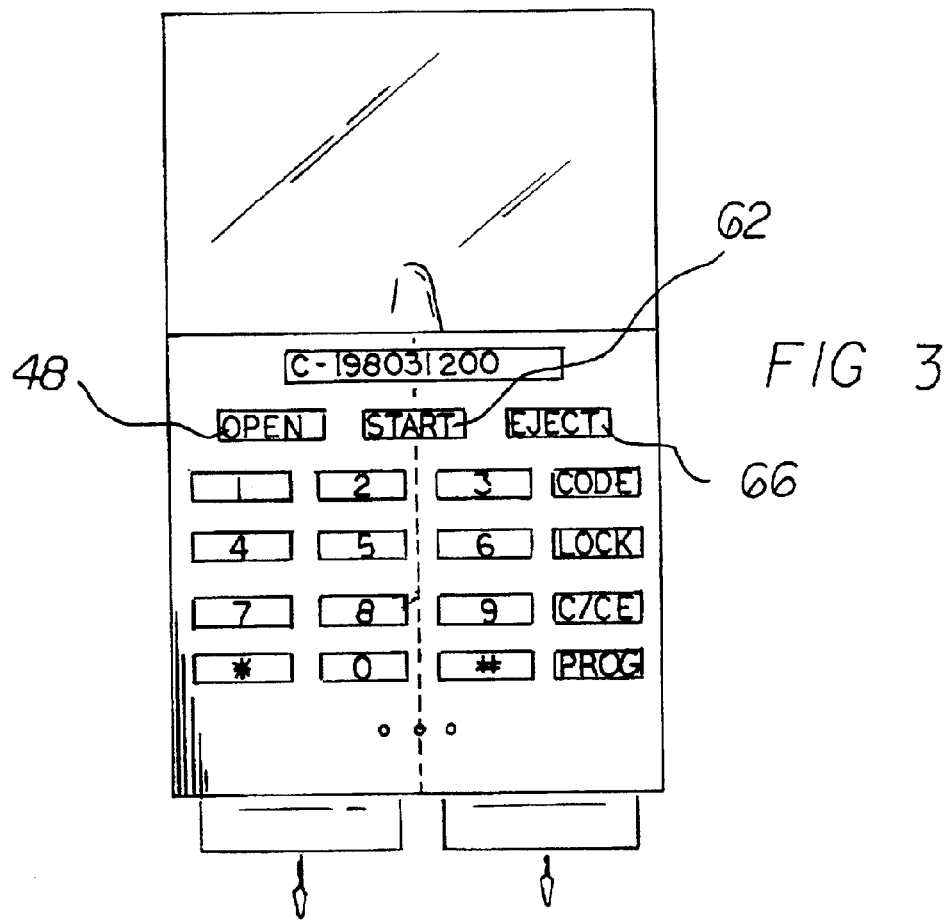
FIG. 3 is a plan view of the system shown in FIG. 1.
Figure 4:
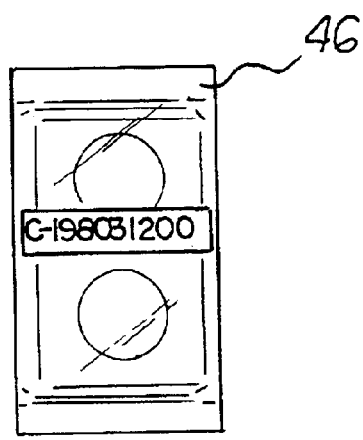
FIG. 4 is a plan view of one of the bags, containing a tape therein, with indicia stamped thereon.

With reference now to the drawings, and in particular to FIG. 1 thereof, the preferred embodiment of the new and improved tamper proof data recording system embodying the principles and concepts of the present invention and generally designated by the reference numeral 10 will be described.

The present invention, the tamper proof data recording system 10 is comprised of a plurality of components. Such components in their broadest context include a housing, means to receive power to the system; an input port, at least one recording device, at least one storage device devices, a handling means, an output receptacle, an open button, input code keys and display, a start key and an off/eject key. Such components are individually configured and correlated with respect to each other so as to attain the desired objective.

First provided in the preferred embodiment is a housing 12 of a generally rectangular configuration having a top face 14, a bottom face, a front face 16, a rear face, a first side face 18 and a second side face. An input port 22 is provided in the housing. The input port is adapted to provide an input signal to the system.

Next provided is a cord 28 adapted to couple with a power supply to provide power to the system through an aperture in the first side face of the housing.

Next provided are a pair of tape recorder heads on the top face of the housing. The tape recorder heads are adapted to simultaneously copy the input signal to a pair of tapes.

A single cover 34 is next provided. The cover encloses both recorder heads. The cover has a locking means to prevent the premature opening of the cover during activation.

Next provided is a handling means adjacent to the tape recorder heads within the housing. The handling means has a bag input 42 on the front face of the housing. The handling means also has an output receptacle 44 on the front face. The handling means is adapted to receive the tapes following recording, stamp protective bags 46 with pertinent and identifiable indicia, seal the tapes in individual plastic protective bags, and dispense the bags containing the tapes through the output receptacle. Access is prevented through the entire process thus providing tamper proof recording of the tapes.

An open button 48 is next provided. The open button is on the top face. The open button is adapted to unlock the cover to the recorder heads and allow the insertion of tapes to be recorded only when no tapes are in the system.

Next provided are a plurality of input code keys 52 and display 54 on the top face of the housing. The keys and display are adapted to allow the user to stamp the bags before the tapes are inserted with pertinent information including but not limited to date, time, and case number.

An external port 60 is provided for transfer of recording to a remote device.

Next provided is a start key 62 on the top face. The start key is adapted to lock the cover to the recorder heads and activate the recording of the input signal.

Finally, an off/eject key 66 is provided on the top face. The off/eject key is adapted to terminate the recording process and to transfer the tapes to the handling means. In this manner from the time the system is activated with the start key and terminated with the off/eject key sending the tapes to the handling means and out the output receptacle, the recorded tapes will be unable to be edited in any way and will be sealed in protective bags for safe keeping.

Figure 5:
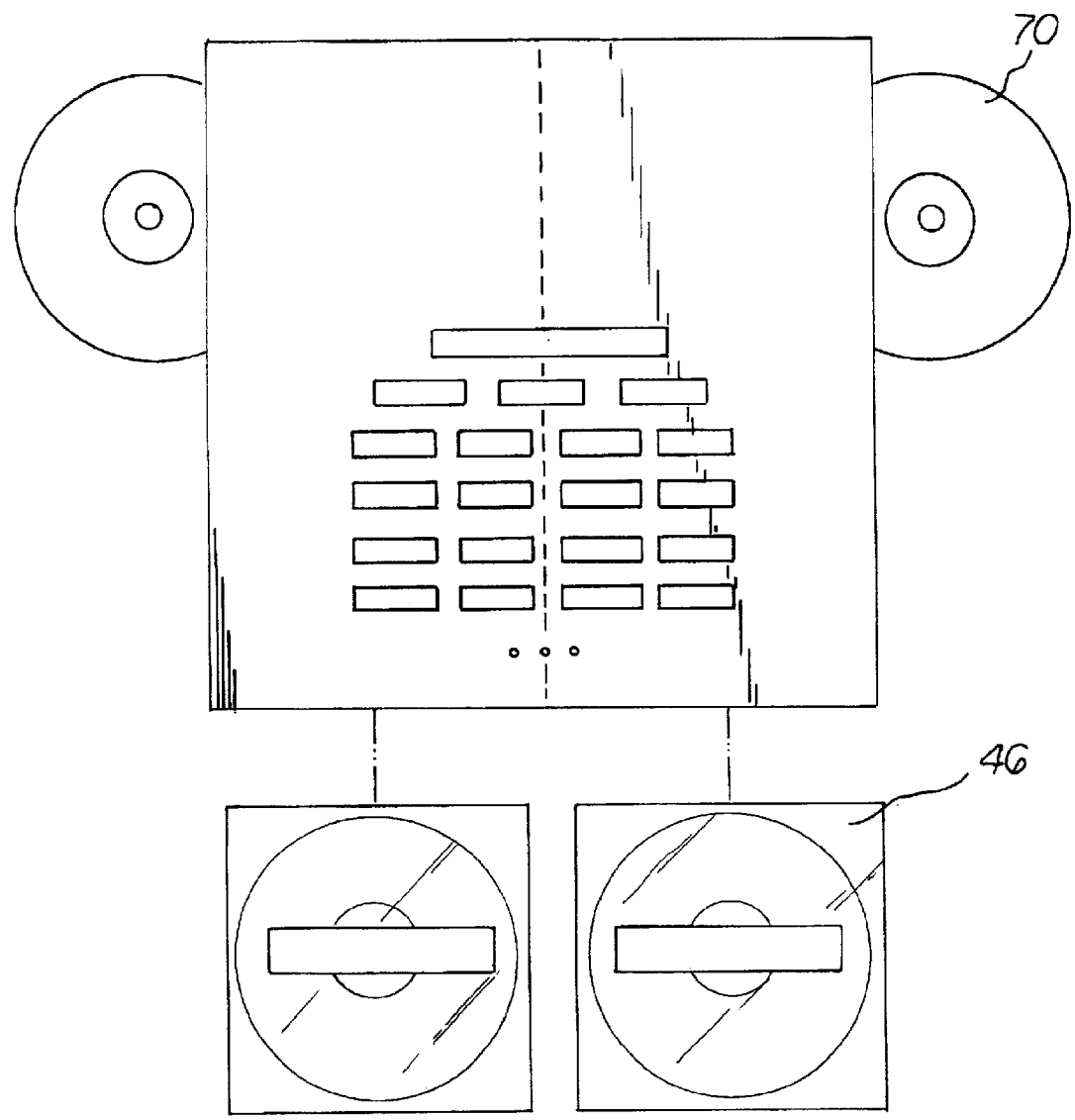
FIG. 5 is a plan view of an alternate embodiment of the system for use with compact disc technology showing the insertion of compact discs and the ejection of bags containing recorded discs.

In an alternate embodiment of the invention, shown in FIG. 5, the recording devices and storage devices 70 relate to compact disk technology.

In still another alternate embodiment of the invention the recording devices and storage devices relate to digital technology and the system.

In other alternate embodiments of the invention the number of recording devices and storage devices may range from one to a plurality.

In a final embodiment an external port may be provided for transfer or downloading of recording to a remote device.

This invention prevents tampering of recorded interrogatories, interviews, etc. Preferably, the recorder has dual recording heads, or more in an expanded version, mounted under the insert cover that simultaneously records two, or more, originals tapes or disks. Original recordings are provided to the parties involved, eliminating the possibility of alteration of the information by one party. The recorder has four operating keys: OPEN, CODE, START, OFF/EJECT. Because there are no pause or stop buttons, it is impossible to eliminate any part of the interrogation or interview session. The OPEN key unlocks the cover to allow insertion of tape or disks for recording. The CODE and input keys are used to enter specific data, such as date, time, case number, etc. This data is a file record that will be stamped on the protective bags before the tapes or disks are inserted and sealed before ejection. The START button automatically locks the cover. The interrogation or interview then begins. The cover remains locked throughout the session so that the recordings cannot be removed or tampered with. When the interrogation or interview is completed, pressing the OFF/EJECT key automatically activates the tamper-proof handling system. All recorded tapes or disks are inserted into separate identically coded bags and sealed before they are ejected from the recording system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A data recording system for providing tamper proof recordings with pre-recording inputs and post-recording handling comprising, in combination:

a housing of a generally rectangular configuration having a top face, a bottom face, a front face, a rear face, a first side face and a second side face;

a cord adapted to couple with a power supply to provide power to the system through an aperture in the first side face of the housing;

an input port to provide an input signal to the system;

a pair of tape recorder heads on the top face of the housing and adapted to simultaneously copy the input signal to a pair of tapes;

a single cover enclosing both recorder heads and having a locking means to prevent the premature opening of the cover during activation;

a handling means adjacent to the tape recorder heads within the housing having a bag input and an output receptacle on the front face of the housing, the handling means being adapted to receive the tapes following recording, seal the tapes in individual plastic protective bags, stamp protective bags with pertinent and identifiable indicia, and dispense tape and bag combination through the output receptacle without providing access thus preventing tampering of the tapes;

an open button on the top face activatable only when no tapes are in the system adapted to unlock the cover to the recorder heads and allow the insertion of the blank tapes;

a plurality of input code keys and display on the top face of the housing adapted to allow the user to stamp the bags before the tapes are inserted with pertinent information including but not limited to date, time, and case number;

an external port for transfer of recording to a remote device;

a start key on the top face adapted to lock the cover to the recorder heads and activate the recording of the input signal; and an off/eject key on the top face adapted to terminate the recording process and to transfer the tapes to the handling means so that from the time the system is activated with the start key and terminated with the off/eject key sending the tapes to the handling means and out the output receptacle, the recorded tapes will be unable to be edited in any way and will be sealed in a protective bag for safe keeping.

2. A data recording system for providing tamper proof comprising:

a housing;

a means to receive power to the system;

an input port adapted to provide an input signal to the system;

at least one recording device adapted to copy the input signal to at least one storage device;

a single cover enclosing all recording devices, the single cover having a locking means;

a handling means adjacent to the recording devices within the housing having an output receptacle, the handling means being adapted to receive the storage devices following recording, seal the storage devices in bags, stamp protective bags with indicia, and dispense the bag containing the storage devices through the output receptacle;

an open button, being activatable only when no storage devices are in the system, adapted to unlock the cover and allow the insertion of the blank storage devices;

a plurality of input code keys and display and adapted to allow the user to stamp indicia on the bags containing the storage devices;

a start key adapted to lock the cover and activate the recording of the input signal; and an off/eject key adapted to stop the recording process and transfer of the storage devices to the handing means.

3. The system as set forth in claim 2 wherein a plurality of recording devices and a plurality of storage devices are provided.

4. The system as set forth in claim 2 wherein the recording devices and storage devices relate to tape technology.

5. The system as set forth in claim 2 wherein the recording devices and storage devices relate to compact disk technology.

6. The system as set forth in claim 2 wherein the recording devices and storage devices relate to digital technology and the system.

7. The system as set forth in claim 2 and further including an external port for transfer of recording to a remote device.

* * * * *